United States Patent
Kruger

(10) Patent No.: US 8,844,711 B2
(45) Date of Patent: Sep. 30, 2014

(54) CHAIN WHEEL ARRANGEMENT FOR MINING MACHINES

(75) Inventor: Wolfgang Kruger, Wuppertal (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 308 days.

(21) Appl. No.: 13/255,716

(22) PCT Filed: Mar. 1, 2010

(86) PCT No.: PCT/IB2010/050878
§ 371 (c)(1),
(2), (4) Date: Sep. 9, 2011

(87) PCT Pub. No.: WO2010/106455
PCT Pub. Date: Sep. 23, 2010

(65) Prior Publication Data
US 2012/0000752 A1    Jan. 5, 2012

(30) Foreign Application Priority Data

Mar. 16, 2009   (DE) .......................... 10 2009 003 623

(51) Int. Cl.
*B65G 23/06* (2006.01)
*F16C 35/077* (2006.01)

(52) U.S. Cl.
CPC ............... *B65G 23/06* (2013.01); *F16C 35/077* (2013.01); *Y10S 384/905* (2013.01)
USPC ............ 198/834; 384/493; 384/557; 384/905

(58) Field of Classification Search
USPC .................. 198/832, 834, 835; 474/152–199; 384/493, 557, 905
See application file for complete search history.

(56) References Cited

U.S. PATENT DOCUMENTS

| | | | |
|---|---|---|---|
| 3,532,402 A * | 10/1970 | Templeton et al. | 384/557 |
| 4,037,713 A * | 7/1977 | Soliman et al. | 198/725 |
| 4,437,564 A | 3/1984 | Redder et al. | |
| 5,074,827 A | 12/1991 | Bandy, Jr. | |
| 5,913,403 A * | 6/1999 | Merten et al. | 198/834 |
| 6,082,907 A * | 7/2000 | Arvidsson | 384/563 |
| 7,604,113 B2 | 10/2009 | Pluszynski et al. | |

FOREIGN PATENT DOCUMENTS

| | | |
|---|---|---|
| DE | 2942916 A1 | 5/1981 |
| DE | 202004013198 U1 | 10/2004 |

* cited by examiner

*Primary Examiner* — William R Harp
(74) *Attorney, Agent, or Firm* — Foley & Lardner, LLP

(57) ABSTRACT

A chain wheel arrangement for chain drives of mining machines, with a chain wheel shaft, with a chain wheel, with bearing shells receiving bearings for the chain wheel shaft, with a chain wheel-side sliding ring seal and with a bearing-side sliding ring seal. In order to improve the service life of the chain wheel arrangement, at least one of the bearings, preferably that of the movable bearing system, is arranged in a bearing bush which is arranged between the bearing shell and outer bearing ring and received in the bearing shell in an axially displaceable manner. The additional bearing bush allows the necessary gap between the rotating parts and the non-co-rotating, bearing shell-side parts to remain substantially constant and to this extent to become independent of the bearing play of the respective bearings.

14 Claims, 2 Drawing Sheets

CHAIN WHEEL ARRANGEMENT FOR MINING MACHINES

The invention relates to a chain wheel arrangement for chain drives of mining machines, with a chain wheel shaft, with a chain wheel having at least one chain starwheel, with bearing shells which are arranged on both sides of the chain wheel, receive bearings for the chain wheel shaft and can be fastened to the machine frame of the chain drive, with a chain wheel-side sliding ring seal and with a bearing-side sliding ring seal between the chain wheel and bearing.

BACKGROUND OF THE INVENTION

In underground mining, chain scraper conveyors, in particular, for the removal of extracted minerals and also the extraction ploughs of coal plough installations are moved by means of chains which are placed along an extraction face in the top and bottom run and driven by means of chain wheels. The chain wheels are mounted on the machine frame of the respective chain drive so as to be rotatable via bearings arranged in bearing shells and can be driven by means of drives which are detachably coupled to the chain wheels. On account of the normally high power capacities of a chain scraper conveyor or an extraction plough, machine frames with drivable chain wheels are usually used at both ends of the extraction installation. Nevertheless, in the case of relatively short faces, it is also possible for only one of the chain wheels to be driven via its chain wheel shaft. In chain scraper conveyors, each chain wheel shaft usually has two chain starwheels to drive a double chain such as for example a double centre chain. In extraction ploughs, on the other hand, the chain wheel shaft has just one chain starwheel. The chain starwheels have pockets for receiving the usually horizontal links of the link chain in order to deflect the chain and at the same time to drive it in the respectively desired direction.

A chain wheel arrangement of the type in question is known from DE 20 2004 013 198 U1. In this chain wheel arrangement, the bearing shells, which receive the bearings for displacing the chain wheel shaft, form at the same time also those mounting means used to position the chain wheel shaft on the machine frame and axially secure it thereto. The axial distance of the two bearing shells from each other is therefore fixed and one of the bearings is, as the person skilled in the art is generally aware, arranged in a movable bearing system, while the other bearing is designed as a fixed bearing system. In the chain wheel shaft of the type in question, a labyrinth seal arrangement is already used to protect the pair of sliding ring seals between the chain wheel and bearing as effectively as possible from contamination with fine coal and water. The labyrinth seal arrangement is achieved by an annular web-shaped projection on a connection piece and also by a groove in the lateral flank of the chain wheel which engage with each other with play, thus allowing the chain wheel shaft and connection piece to rotate relative to each other.

Within the known chain wheel arrangement, in particular the labyrinth seal arrangement used there, allows a relatively long service life of the chain wheel arrangement and also of the bearings used to be achieved without maintenance work. The assembly of the chain wheel arrangement of the type in question is nevertheless relatively complex, as spacer bushes and clamping sleeves have to be fitted in order to hold the bearing rings of the respective bearings in position. Furthermore, increased soiling of the sliding ring seals is displayed after a large number of operating hours on account of an increase in the play within the labyrinth seal arrangement.

DE 29 42 916 C2 discloses a machine frame for a chain conveyor, the side cheeks of which comprise openings for receiving the bearing shells. The bearing shells are welded onto the side cheeks, which are thickened to this end.

SUMMARY OF THE INVENTION

An object of the invention is to provide a chain wheel arrangement which allows a still improved service life and which does not have the aforementioned drawbacks.

According to the invention, this object and others are achieved in that at least one of the bearings is arranged in a bearing bush which is arranged between the bearing shell and outer bearing ring of the bearing and is received in the bearing shell in an axially displaceable manner. In the chain wheel arrangement according to the invention, the additional bearing bush, which receives the bearing and is at the same time received in the bearing shell in an axially displaceable manner, allows the necessary gap between the rotating parts of the chain wheel, on the one hand, and the non-co-rotating, bearing shell-side parts, on the other hand, to remain substantially constant and to this extent to become independent of the bearing play of the respective bearings. This leads to a further improvement in the sealing of that space in which the pair of sliding ring seals is arranged between the chain wheel and bearing, thus improving the service life of the sliding ring seals and therefore the overall service life of the bearing or chain wheel arrangement.

In a particularly preferred configuration, the bearing bush has on the chain wheel side an annular extension, against the inner shoulder of which the bearing-side sliding ring seal rests. This annular shoulder, again, allows a labyrinth seal arrangement to be provided, wherein the distance from the end side of the annular extension to the chain wheel can remain constant on account of the displaceable bearing bush used, irrespective of the play or state of wear of the bearings used. The configuration according to the invention has in particular advantages on that bearing or within that bearing shell which forms or receives what is known as the movable bearing system and generally only the movable bearing system will obtain the arrangement according to the invention with the displaceable (movable) bearing bush. However, an identical arrangement could also be used in the fixed bearing system, even if in that case the movement play of the bearing bush is then to be prevented there or the bearing bush is to be fixed.

It is particularly advantageous if the bearing bush is embodied as a split bearing bush and has at least a first cylindrical bush part which has the annular extension and also a bearing seat and into which the bearing can be inserted and positioned with its outer bearing ring. Also preferably, a retaining ring can then be provided that can be used to secure the outer bearing ring of the bearing in the bearing seat, in particular to immovably secure it in the bearing seat. According to a possible configuration, the bush part can in this case have an annular collar to which the retaining ring can be fastened or is fastened for closing the bearing seat. The fastening can for example be carried out via screws or the like which reach through the retaining ring into the annular collar. However, it is also possible for a screw thread to be provided between the bush part and retaining ring or for the parts to be adhesively bonded or the like.

The bearing arrangement according to the invention has advantages in particular if a closure element is co-rotatably positioned on a shaft end of the chain wheel shaft, a second pair of sliding ring seals advantageously being arranged between the closure element and bearing bush. In particular, in this configuration, the retaining ring can have at the inner circumference a wedge shoulder for bearing one of the sliding ring seals of the second pair of sliding rings. The closure element can selectively be a cover or else a gear rim, in particular a worm gear rim, which is non-rotatably secured to the shaft end via a splined shaft toothing and is fastened to the end shaft in an axially fixed manner by means of a closing cover.

In all of the configurations, it is particularly advantageous if the bearing shell is provided with a collar web which protrudes axially toward the chain wheel and radially covers a chain wheel-side web extension which, in turn, radially covers the annular extension on the bearing bush to provide with the collar web, web extension and annular extension a labyrinth seal arrangement having a constant axial spacing, at least in a gap portion of the labyrinth seal. Depending on the configuration of the chain wheel, the web extension can be embodied directly on the chain wheel or else on a spacer piece arranged as an axially outer element of the chain wheel between the bearing and chain starwheel.

Chain scraper conveyors, in particular double-chain scraper conveyors, are the main area of application of the chain wheel arrangement or bearing arrangement according to the invention. The chain wheel is therefore preferably embodied for a double-chain scraper conveyor and has two chain starwheels which are non-rotatably slid onto a respective inner splined shaft toothing on the chain wheel, in each case at least one spacer piece additionally being arranged if appropriate between the chain starwheel and adjacent bearing, as a result of which the spacer piece can then preferably rest against the inner bearing ring of the bearing with a clamping web. Also preferably, the second sliding ring seal of the first pair of sliding ring seals can rest against an oblique shoulder on the spacer piece. The use of spacer pieces allows the position of the chain wheel or the chain starwheels to be adapted to the respectively defined dimensions of the machine frame, wherein the chain wheel shaft can at the same time be mounted and dismounted relatively easily. The bearing bush is preferably received in the bearing shell by means of an anti-rotation means, in particular a single cylinder pin or the like, in a non-rotatable and at the same time exclusively axially displaceable manner.

Further advantages and configurations of a chain wheel arrangement according to the invention will emerge from the following description of a preferred configuration shown schematically in the drawings.

Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
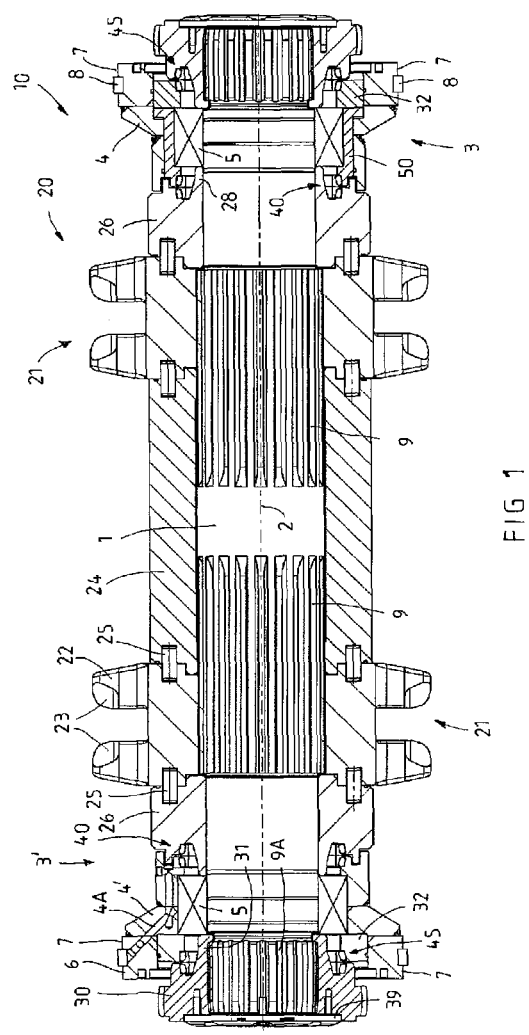
FIG. 1 is an axial section of a chain wheel arrangement according to the invention.

Referring now to the drawings wherein the showings are for the purpose of illustrating preferred and alternative embodiments of the invention only and not for the purpose of limiting same, a chain wheel arrangement, which in FIG. 1 is denoted in its entirety by reference numeral 10, is shown in a configuration for a double-chain scraper conveyor or double-side chain scraper conveyor and consists in its main components of a central chain wheel shaft 1 with a chain wheel axis 2, of a chain wheel denoted in its entirety by reference numeral 20 and also of two bearing systems 3, 3' each having a bearing shell 4, 4' and also a bearing 5 arranged within the bearing shell. The bearing system 3 shown on the right in FIG. 1 functionally forms a movable bearing system and the bearing system 3' on the left in FIG. 1 forms a fixed bearing system for the respective bearing 5, in this case consisting respectively of a spherical roller bearing. Both bearing shells 4, 4', together with the bearings 5, serve to displace the chain wheel arrangement 10 on a machine frame (otherwise not shown) of a chain scraper conveyor which has for this purpose, for example in the side cheeks, apertures which are open on the edge side and into which the bearing shells 4, 4' can be inserted and fixedly mounted axially and also in a rotationally locked manner via a tongue-and-groove connection or fitting groove connection. For simple mounting, the bearing shells 4, 4' can have a displacement portion 6 which at the outer circumference is embodied in a U-shaped manner, for example, and has two mutually parallel lateral flanks 7 which are provided with a key groove 8 in order to be able to insert the bearing shells 4, 4' into appropriate bearing recesses on the side cheeks in a correspondingly axially fixed manner and so as to be secured with rotational locking.

The chain wheel 20, which in the exemplary embodiment shown is designed for a double-side chain scraper conveyor, accordingly has two chain starwheels 21 each provided with two rows of teeth 22, at the circumference of which pockets 23 positioned facing one another are formed to receive in particular the horizontal chain links (not shown) of a scraper chain between adjacent pockets 23, thus allowing the chain to be deflected about the chain wheel axis 2 and at the same time to be driven. Each of the two chain starwheels 21 is positioned non-rotatably on a portion of a splined shaft toothing 9 on the chain wheel shaft 1 and both chain starwheels 21 can, from the respective shaft ends of the chain wheel shaft 1, be slid onto the associated splined shaft toothing 9 or be drawn down therefrom. The distance between the two chain starwheels 21 is determined via a spacer sleeve 24 which is also part of the chain wheel 20 and is connected in a rotationally locked manner in each case to inner flanks of the chain starwheels 21 via pins 25. Spacer pieces 26, which form the outer part or portion of each chain wheel 20 and are in turn coupled to the chain starwheels 21 via further pivot pins 25 in a non-rotatable but axially detachable manner, rest against the outer flanks of both chain starwheels 21. In the exemplary embodiment shown, both spacer pieces 26 have on the bearing side an axially inwardly protruding, cylindrical clamping leg 28 which rests with its outer end side against the bearing 5, in particular in the inner bearing ring (5A, FIG. 2) of the bearing 5. Furthermore, retaining legs 31, which are part of a closure element which is formed in this case by a worm wheel 30 and slid non-rotatably onto a further splined shaft toothing portion 9A on the chain wheel shaft 1 and is fastened to the shaft end of the chain wheel shaft 1 via a closing cover 39 and fastening screws (not shown) in a rotationally locked and axially fixed manner, rest against the inner bearing ring of the bearing 5, in each case on the shaft end side. The retaining legs 31 can consist of the wedges, formed on the closure element, for the splined connection.

A first respective pair of sliding ring seals 40, which is protected by means of a labyrinth seal arrangement both in the region of the bearing shell 4' of the fixed bearing 3' and in the region of the bearing shell 4 of the movable bearing 3, is arranged between the bearing shells 4, 4', which are in operational use, and the outermost portion of the chain wheel 20 that rotates jointly with the chain wheel 20 and is formed in the exemplary embodiment shown by the spacer pieces 26, but could also consist directly of a portion of the chain starwheels. The labyrinth seal arrangement is formed by portions of the bearing shells 4, 4' or the bearing system that engage with one another with play, on the one hand, and of the spacer piece 26, on the other hand. Preferably, the labyrinth seal is filled with grease and can be lubricated via a lubricant groove 4A, as indicated on the bearing shell 4' of the fixed bearing system 3. A second pair of sliding ring seals 45 is arranged in each case between the worm wheel 30 or co-rotating closure element and an outer retaining ring 32 for the bearing 5.

Figure 2:
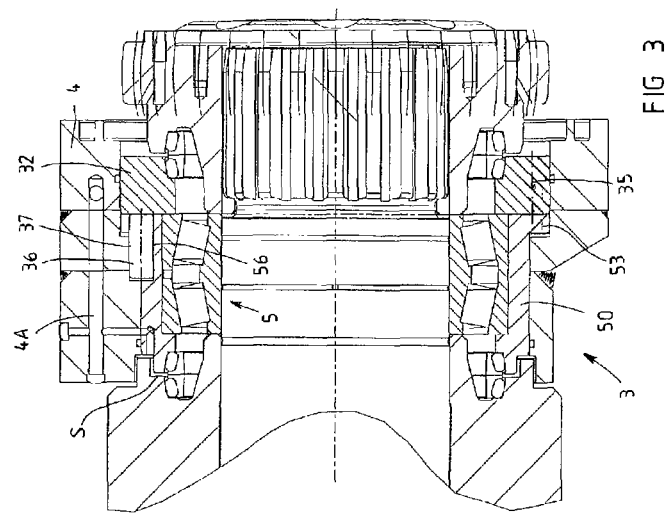
FIG. 2 is a detailed view of the movable bearing system of the chain wheel arrangement according to FIG. 1 in section.

The invention relates in particular to the configuration of the movable bearing system 3 and to an improvement of the bearing arrangement on the movable bearing system 3, and this will now be commented on with reference to FIG. 2 which is an enlarged view of the movable bearing system 3. FIG. 2 shows in detail, of the bearing 5, both the inner bearing ring 5A and the outer bearing ring 5B and also the rolling bodies 5C arranged between both bearing rings 5A, 5B. FIG. 2 clearly shows that the outer bearing ring 5B of the bearing 5 is not directly in contact with the inner circumference of the bearing shell 4, but that there is arranged between the bearing 5 and a bearing seat in the bearing shell 4 an additional bearing bush 50, against the inner circumference 51 of which the outer bearing ring 5B rests, whereas the bearing bush is received with its outer circumference in the bearing shell 4 with play in such a way that the bearing bush 50 is axially movable relative to the bearing shell 4 by a certain play. The bearing bush 50 has, at its end facing the shaft end, an annular collar 53 which protrudes outward via a cylindrical bush jacket 52 and also serves as a stop and delimits in one direction the movement play for the bearing bush 50 together with an inner shoulder 12 on the bearing shell 4. At its chain wheel-side end, the bearing bush 50 has an annular extension 54, at the inner circumference of which a wedge shoulder 55 is embodied for receiving and bearing the outer sliding ring seal 41 of the first pair of sliding ring seals 40. The second sliding ring seal 42, which interacts with the first sliding ring seal 41, rests, as described hereinbefore, against a wedge shoulder on the spacer piece 26 and rotates jointly therewith relative to the sliding ring seal 41.

Formed between an end face 26', which is positioned facing the shaft end, and the leading end of the annular extension 54 is a running mechanism or bearing gap which in FIG. 2 is denoted by reference symbol S and which can remain constant, on account of the provision according to the invention of the bearing bush 50 between the bearing shell 4 and the bearing 5 of the movable bearing system 3, irrespective of the bearing play of the bearing 5, even if thermal expansion or the like causes the distance between the spacer piece 26 and the end side of the bearing shell 4 on the movable bearing system 3 to decrease. The first pair of sliding ring seals 40 is protected from the infiltration of fine coal, water and the like via a labyrinth seal arrangement consisting firstly of the annular extension 54 on the bearing bush 50, also of an axially outwardly protruding web extension 27 on the spacer piece 26 as well as a collar web 13 which protrudes toward the chain wheel or spacer piece and the axial length of which is greater in the exemplary embodiment shown than the axial length of the annular extension 54 on the bush part 50.

The retaining ring 32, as the, if appropriate, second element or closing element of the bearing bush 50, rests against the outer surface of the annular collar 53 of the bearing bush 50. The retaining ring 32 is securely connected to the first bush part 50, which is then formed by the bearing bush, via screws 35 arranged distributed over the circumference. At the same time, the retaining ring 32 presses partially against the outer bearing ring 5B of the bearing 5, so that the bearing bush 50 is displaceably received, together with the outer bearing ring 5B, in the bearing receptacle 4. On the shaft end side, the retaining ring 32 has at its inner circumference an oblique shoulder 33 which retains one of the two sliding ring seals 46 of the second pair of sliding rings 45, whereas the second sliding ring seal 47 of the second pair of sliding rings 45 rests against a shoulder 34 of the worm gear wheel 30.

Figure 3:
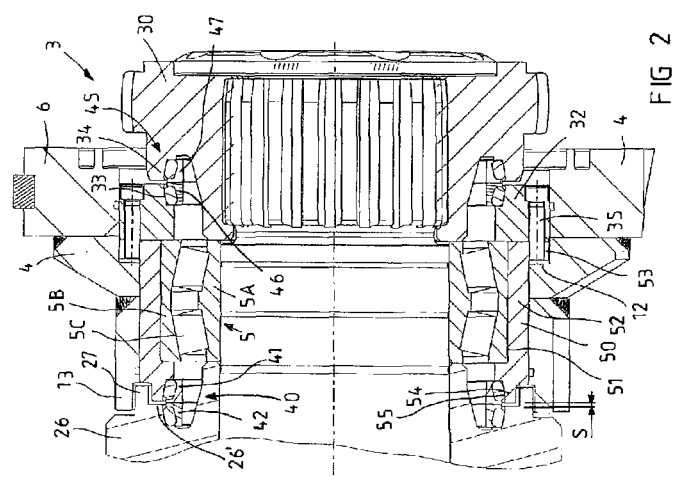
FIG. 3 is a detailed view of the movable bearing system according to FIG. 1 in an angularly offset section.

FIG. 3 shows the same movable bearing system as FIG. 2 in a section which is angularly offset by about 45°. The sectional view according to FIG. 3 also shows inter alia the lubricant grooves 4A in the bearing shell 4 of the movable bearing system 3 for lubricating the labyrinth seal additionally protecting the bearing gap S. Furthermore, the sectional view in FIG. 3 shows the rotationally locked fixing of the bearing bush 50 of the movable bearing system 3 in the bearing shell 4, allowing only axial movability of the bearing bush 50 relative to the bearing shell 4. Formed at the outer circumference of the bearing bush 50 is at least one open-edged semicircular groove 56 which runs parallel to the axis of rotation and into which is inserted with play, as an anti-rotation means, a cylinder pin 36 which with its jacket protrudes partially beyond the outer circumference of the bearing bush 50 and thereby engages with a second complementarily formed semicircular groove 37, which extends in an axially parallel manner, at the inner circumference of the bearing shell 4. In the exemplary embodiment shown, the pin is positioned loose between the retaining ring 32 and bearing bush 50. The cylinder pin forming the anti-rotation mechanism could also be embodied directly on the retaining ring 32 or engage with a depression on the retaining ring. As the torsional forces are low, a single cylinder pin 36 is normally sufficient.

The foregoing description will suggest to the person skilled in the art a large number of modifications which are intended to come under the scope of protection of the appended claims. In principle, the construction of the bearing system, in particular that of the movable bearing system with the additional bearing bush, may be used with any type of chain wheel for a chain drive of a mining machine, such as in particular a chain scraper conveyor or plough drive or the like. The chain wheel could have a single chain starwheel but also two directly abutting chain starwheels for a double-centre chain scraper conveyor.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A chain wheel arrangement for chain drives of mining machines, with a chain wheel shaft, with a chain wheel having at least one chain starwheel, with bearing shells which are arranged on both sides of the chain wheel, receive bearings for the chain wheel shaft and are fastenable to the machine frame of the chain drive, with a chain wheel-side sliding ring seal and with a bearing-side sliding ring seal between the chain wheel and bearing, at least one of the bearings is arranged in a bearing bush which is arranged between the bearing shell and an outer bearing ring of the bearing and is received in the bearing shell in an axially displaceable manner, wherein at least one of the bearing shells is provided with a collar web which protrudes axially toward the chain wheel and radially covers a chain wheel-side web extension protruding from the chain wheel toward the bearing, wherein the web extension radially covers an annular extension protruding from the bearing bush toward the chain wheel, and wherein the collar web, web extension, and annular extension form a labyrinth seal to cover the chain wheel-side sliding ring seal and the bearing-side sliding ring seal.

2. The chain wheel arrangement according to claim 1, wherein the bearing bush has on the chain wheel side an annular extension, against the inner shoulder of which the bearing-side sliding ring seal rests.

3. The chain wheel arrangement according to claim 2, wherein the bearing bush is embodied as a split bearing bush and has a cylindrical bush jacket having the annular extension and a retaining ring which can be used to secure the outer bearing ring of the at least one bearing in the bearing seat.

4. The chain wheel arrangement according to claim 3, wherein the retaining ring secures the outer ring immovably.

5. The chain wheel arrangement according to claim 3, wherein the bearing bush further includes a bush jacket having an annular collar against which the retaining ring rests or to which the retaining ring is fastened for closing the bearing seat.

6. The chain wheel arrangement according to claim 1, wherein a closure element is co-rotatably positioned, at least on a shaft end of the chain wheel shaft, a second pair of sliding ring seals being arranged between the closure element and the at least one bearing.

7. The chain wheel arrangement according to claim 6, further comprising a retaining ring having at the inner circumference a wedge shoulder for bearing one of the sliding ring seals of the second pair of sliding rings.

8. The chain wheel arrangement according to claim 6, wherein the closure element is a gear rim which is non-rotatably secured to the shaft end via a splined shaft toothing and is fastened to the end shaft in an axially fixed manner by means of a closing cover.

9. The chain wheel arrangement according to claim 1, wherein the web extension is embodied on a spacer piece which is arranged as an axially outer element of the chain wheel between the at least one bearing and the chain starwheel.

10. The chain wheel arrangement according to claim 9, wherein the chain wheel is embodied for a double-chain scraper conveyor, the chain wheel having two chain starwheels, which are non-rotatably slid onto a respective inner splined shaft toothing, and having in each case at least one spacer piece between the chain starwheel and an adjacent bearing, which rests with a clamping leg against the inner bearing ring of the adjacent bearing.

11. The chain wheel arrangement according to claim 9, wherein the chain wheel-side sliding ring seal of the first pair of sliding ring seals rests against an oblique shoulder on the spacer piece.

12. The chain wheel arrangement according to claim 1, wherein the chain wheel is embodied for a double-chain scraper conveyor, the chain wheel having two chain starwheels, which are non-rotatably slid onto a respective inner splined shaft toothing, and having in each case at least one spacer piece between the chain starwheel and an adjacent bearing, which rests with a clamping leg against the inner bearing ring of the adjacent bearing.

13. The chain wheel arrangement according to claim 1, wherein the bearing bush is received in the bearing shell by means of a pin in a non-rotatable and axially displaceable manner.

14. The chain wheel arrangement according to claim 1, wherein the collar web has an axial length greater than the axial length of the annular extension.

* * * * *